United States Patent [19]
Nagahara

[11] Patent Number: 5,731,885
[45] Date of Patent: Mar. 24, 1998

[54] RECORDING APPARATUS

[75] Inventor: Hideaki Nagahara, Yokohama, Japan

[73] Assignee: Canon Kabushiki Kaisha, Tokyo, Japan

[21] Appl. No.: 904,889

[22] Filed: Aug. 4, 1997

Related U.S. Application Data

[63] Continuation of Ser. No. 230,206, Apr. 20, 1994, abandoned.

[30] Foreign Application Priority Data

Apr. 21, 1993 [JP] Japan ................................. 5-094444
Mar. 11, 1994 [JP] Japan ................................. 6-041097

[51] Int. Cl.⁶ ...................... H04N 1/21; H04N 1/23; H04N 1/00; G03G 15/00
[52] U.S. Cl. .................. 358/496; 358/400; 358/498; 358/296; 399/21
[58] Field of Search .................. 358/400, 474, 358/496, 498; 399/296, 21, 181; 271/109, 113, 162, 164

[56] References Cited

U.S. PATENT DOCUMENTS

| | | | |
|---|---|---|---|
| 4,257,700 | 3/1981 | Tsuda et al. | 355/3 T |
| 4,629,307 | 12/1986 | Miyai et al. | 355/3 R |
| 4,635,010 | 1/1987 | Miyai et al. | 355/3 R |
| 4,768,100 | 8/1988 | Kunishima et al. | 358/498 |
| 4,783,669 | 11/1988 | Piatt et al. | 355/309 |
| 4,910,551 | 3/1990 | Onoda et al. | 399/21 |
| 5,040,206 | 8/1991 | Tokumasu et al. | 358/400 |
| 5,085,422 | 2/1992 | Sagara | 271/162 |
| 5,294,106 | 3/1994 | Takagi et al. | 271/164 |

FOREIGN PATENT DOCUMENTS

3-64366  3/1991  Japan.

*Primary Examiner*—Edward L. Coles, Sr.
*Assistant Examiner*—Kimberly A. Williams
*Attorney, Agent, or Firm*—Fitzpatrick, Cella, Harper & Scinto

[57] ABSTRACT

A recording apparatus is comprised of recording means for recording record information on a sheet, a conveyance path for guiding the sheet to the recording means, and an opening formed in the body of the apparatus accessing the conveyance path to enable the sheet that is stopped in the course of the conveyance path to be pulled out.

18 Claims, 10 Drawing Sheets

RECORDING APPARATUS

This application is a continuation of application Ser. No. 08/230,206, filed Apr. 20, 1994, now abandoned.

BACKGROUND OF THE INVENTION

1. Field of the invention

This invention relates to a recording apparatus such as a facsimile machine, a copying machine or a printer.

2. Related Background Art

Various information processing instruments have been developed with the development of the information processing system. Of these instruments, recording apparatuses such facsimile machines and printers have come to be widely used not only in offices but also in homes. It has therefore become necessary to make certain problems easier to cope with.

Heretofore, when a sheet has been jammed in the course of conveyance, a sheet conveying path has been opened to permit the jammed sheet to be pulled out. In order to facilitate this jam treatment, a construction as described, for example, in Japanese Patent Laid-Open Application No. 3-64366 has heretofore been adopted.

Figure 10:
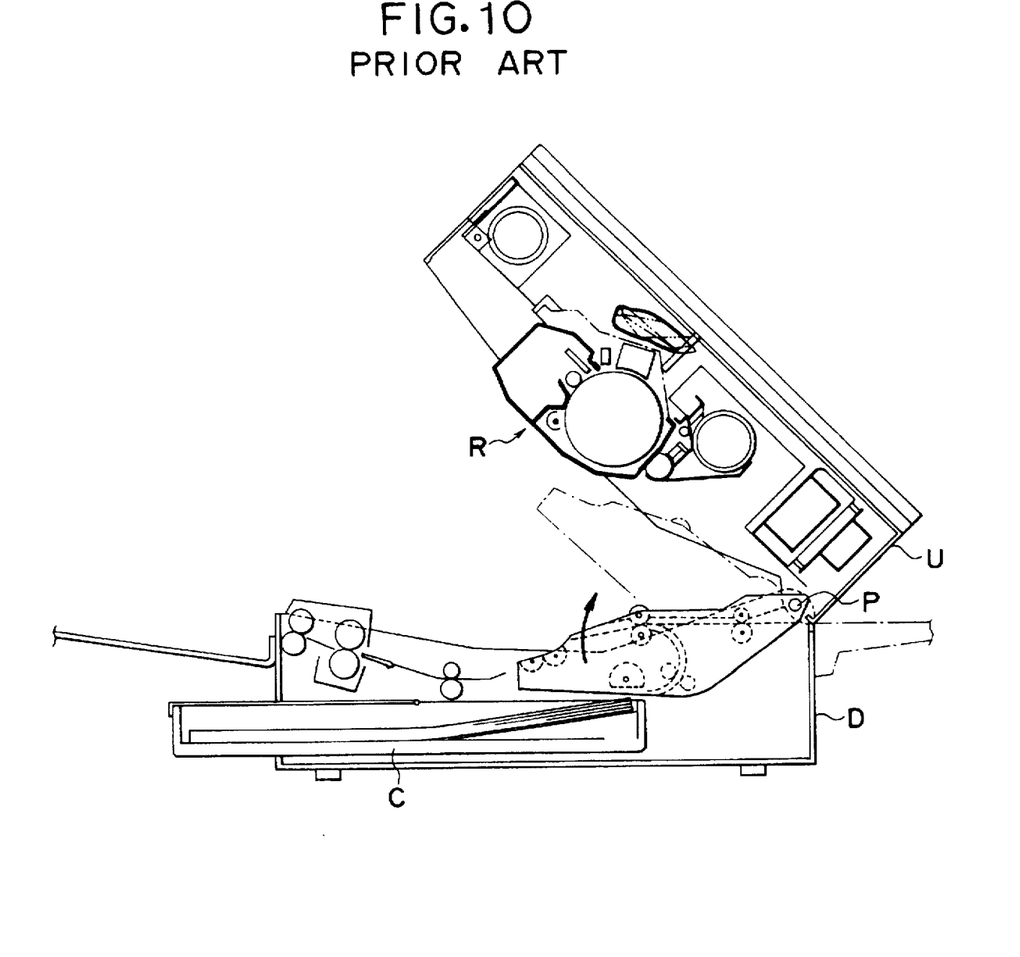
FIG. 10 illustrates a construction for jam treatment in a recording apparatus according to the prior art.

That is, as shown in FIG. 10 of the accompanying drawings, an apparatus body is constructed of a lower apparatus frame D in which a cassette C is mounted and an upper apparatus frame U in which a recording unit R is disposed, and the upper apparatus frame U is designed to be capable of being opened and closed up and down relative to the lower apparatus frame D with a conveyance path as the boundary about a pivot body P. By the upper apparatus frame U being opened as shown in FIG. 10, a jammed sheet can be readily pulled out of the conveyance path.

However, the jam treating mechanism of the above-described recording apparatus according to the prior art has suffered from the following problems. Since the upper apparatus frame U in which the heavy recording unit R is provided is pivotally moved up about the pivot body P, a great load is applied to the pivot body P and thus, the pivot body P must be made strong and this leads to a high cost. Also, the sheet Rust be pulled out with the heavy upper apparatus frame U raised, and this leads to more difficult operations, i.e. cumbersome jam treating. Further, there arises a problem that each time the jam treatment is effected, the upper apparatus frame U is moved up and down, whereby the pivot body P is loosened and positioned deviation occurs between the upper apparatus frame U and the lower apparatus frame D to thereby reduce recording accuracy gradually.

SUMMARY OF THE INVENTION

The present invention has been made in view of the above-noted problems and the object thereof is to provide a recording apparatus which ensures easy jam treating with a simple construction in which jam treatment does not adversely affect a recording unit.

To achieve this object, a recording apparatus has an apparatus body provided with supporting means for supporting a sheet, a sheet feeding portion for feeding the sheet supported by said sheet supporting means, a record portion for recording record information on the sheet fed by said sheet feeding portion, and a conveyance path for guiding the sheet conveyed from said sheet feeding portion to said record portion. It is characterized in that an opening for accessing the conveyance path to enable the sheet in said conveyance path to be pulled out is formed in the outer surface of the apparatus body.

The present invention is characterized in that said opening is formed in the bottom surface of said apparatus body, that said opening is formed in the extension of said conveyance path, and that said opening is formed in a side of said apparatus body.

The present invention is a recording apparatus provided with a cassette containing a plurality of sheets therein and removably provided in an apparatus body, a separating portion for separating the sheets contained in the cassette one by one and feeding them, a record portion for recording record information on the sheets separated by said separating portion, and a conveyance path for guiding the sheets conveyed from said separating portion to said record portion. It is characterized in that an opening for accessing the conveyance path to enable the sheets in said conveyance path to be pulled out is formed in the bottom surface of said apparatus body, and provision is made of supporting means for supporting said apparatus body in its upright state.

The present invention is characterized in that said separating portion has a rotatable feeding member for feeding the sheets, a separating member urged against said rotatable feeding member to separate the sheets, and a pressure releasing mechanism for releasing the pressure contact force between said rotatable feeding member and said separating member, and that said pressure releasing mechanism releases the pressure contact force in response to the separation of said cassette from the apparatus body.

The present invention is characterized by the provision of a feeding rotatable member for feeding the sheets to said conveyance path while holding the sheets with predetermined feeding pressure, and an operatively associated mechanism for releasing said feeding pressure in operative association with the release of the pressure contact force between said rotatable feeding member and said separating member by said pressure releasing mechanism.

The present invention is characterized in that said conveyance path is disposed substantially vertically and said opening is disposed on the extension of said conveyance path, and that said record portion is disposed in the rear of the apparatus body and has its center of gravity positioned at the down side in a state in which the apparatus body is made upright.

DETAILED DESCRIPTION OF THE PREFERRED EMBODIMENTS

Figure 1:
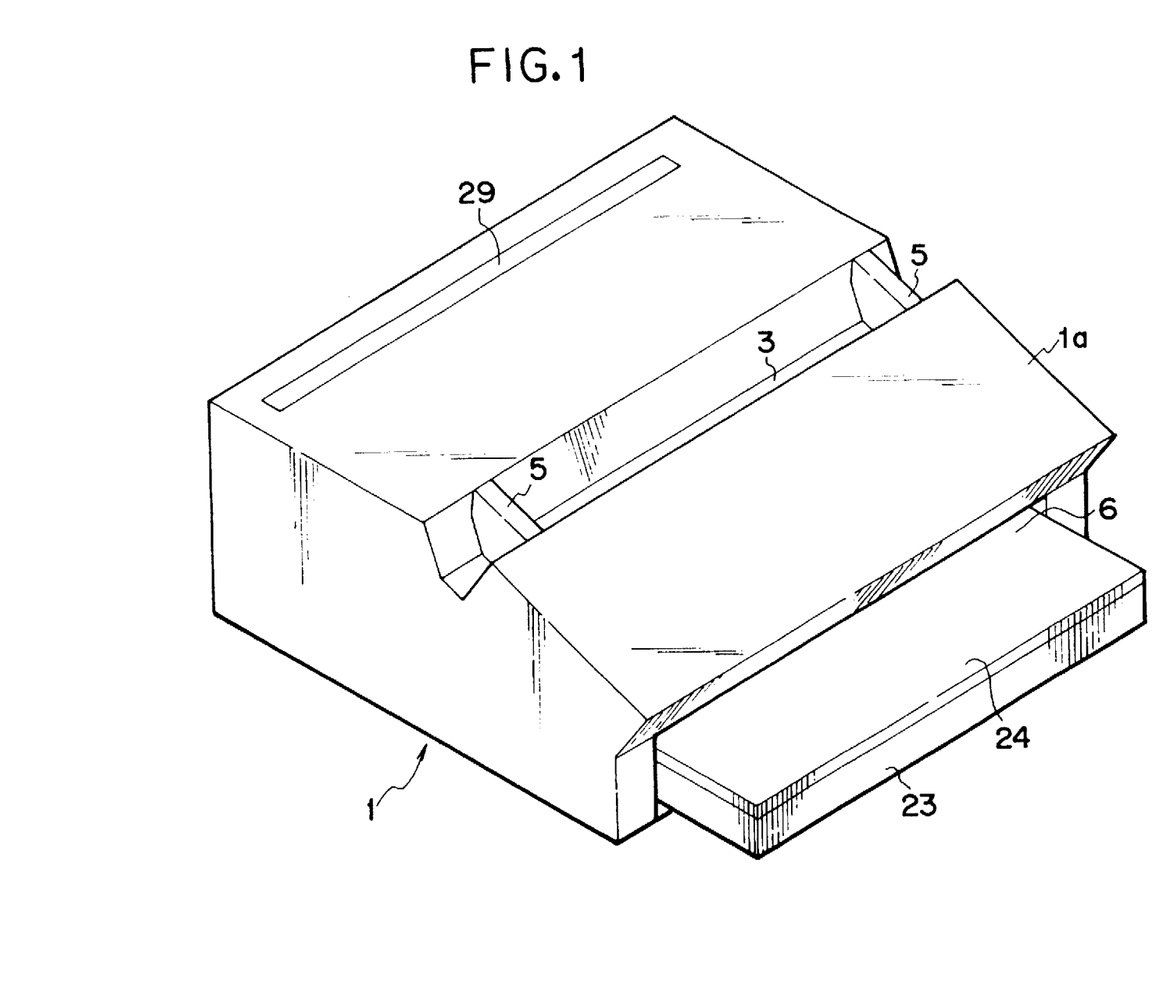
FIG. 1 is a perspective view of a facsimile machine which is a recording apparatus according to an embodiment of the present invention.
Figure 2:
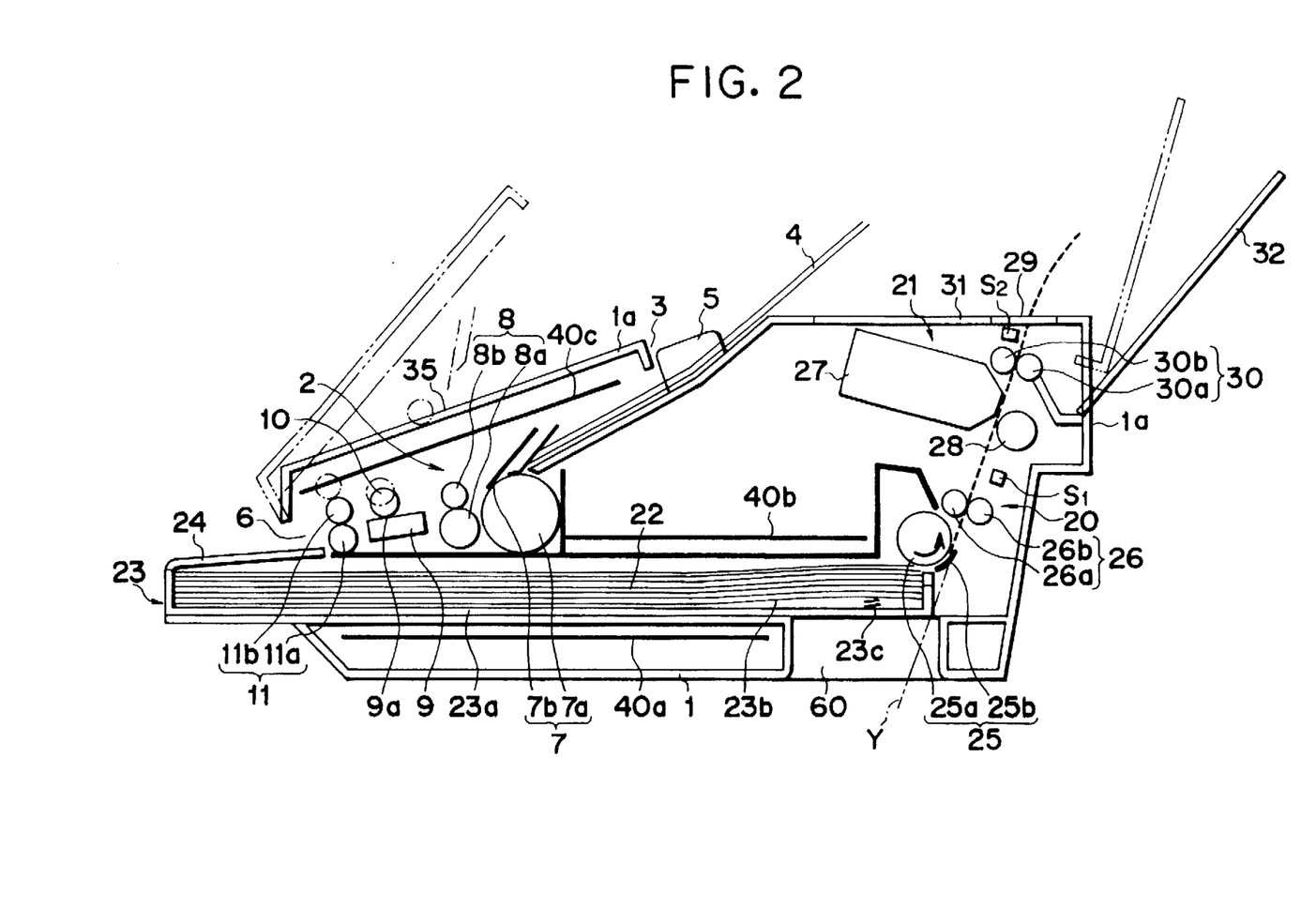
FIG. 2 is a longitudinal cross-sectional view of the facsimile machine shown in FIG. 1.

FIG. 1 is a pictorial view of a facsimile machine embodying the present invention, and FIG. 2 is a central cross-sectional view of the facsimile machine.

The general construction of the apparatus will first be described with reference to FIGS. 1 and 2. The reference numeral 1 designates an apparatus body having its upper surface cover 1a inclined so as to be low at one end thereof (the left side in FIG. 2), and formed compactly as a whole. An original read portion 2 is provided at one end side (the left side in FIG. 2) of the apparatus body 1. An original guide 5 is slidable in a direction along the width of an original 4 which is provided in the original insertion port 3 of the original read portion 2.

Also, in the original conveyance path of the original read portion 2, i.e., between the original insertion port 3 and an original discharge port 6 provided at the left end of the upper surface cover 1a of the apparatus body 1, there are disposed a separating portion 7 having a separating roller 7a and an urging piece 7b urged against the separating roller 7a and separating originals 4 fed from the original guide 5 one by one, a feeding portion 8 comprising a pair of feeding roller 8a and back-up roller 8b for feeding the original 4 separated by the separating portion 7, a close contact type image sensor 9 as reading means for reading the image information of the original 4 conveyed from the feeding portion 8, a white roller (CS roller) 10 as close contact means opposed to the close contact type image sensor 9 and conveying the original 4 while bringing the original 4 into close contact with the reading position 9a of the close contact type image sensor 9 with a predetermined pressure force, and a discharge portion 11 comprising a discharge roller 11a and sheet back-up roller 11b for discharging the original 4 after being read from the original discharge port 6.

The reading operation of the original read portion 2 will now be described.

When the originals 4 are set on the original guide 5 and a read starting signal is inputted by an operation switch (not shown), a drive motor (not shown) is driven and the separating roller 7a, the feeding roller 8a, the discharge roller 11a and the white roller 10 are rotated, and the originals 4 are separated one by one by the separating portion 7 and are conveyed to the feeding portion 8. When the leading end of the original 4 is then detected by an original leading end detecting sensor (DES sensor) (not shown), the drive motor is stopped, whereby the rotation of the separating roller 7a, the feeding roller 8a, the discharge roller 11a and the white roller 10 is once stopped.

When a predetermined time then elapses, the drive motor is again driven and the separating roller 7a, the feeding roller 8a, the discharge roller 11a and the white roller 10 are rotated. During the time from after the rotation of the rollers 7a, 8a, 11a and 10 is started until the leading end of the original 4 is conveyed to the reading position 7a of the close contact type image sensor 9, the peripheral surface (white which is the reference color) of the white roller 10 is read by the close contact type image sensor 9.

When the leading end of the original 4 is then conveyed to the reading position 9a of the close contact type image sensor 9, the image information of the original 4 is read. At this time, the original 4 is urged from right above the reading position 9a of the close contact type image sensor 9 by the white roller 10, that is, the reading line of the close contact type image sensor 9 and the bus line of the white roller 10 are coincident with each other and therefore, the original 4 does not float up from the reading position 9a and the image information can be read with good accuracy.

When the reading of the original 4 is completed in this manner, the original 4 is fed to the discharge portion 11 by the white roller 10 which also serves to convey the original, and is discharged out of the apparatus through the original discharge port 6 by the discharge roller 11a. Thus, the reading of the image information of one original 4 is completed.

When the original being read is jammed during the reading operation, the upper surface cover 1a opens with center of rotation in the vicinity of the original discharging portion, as indicated by dots-and-dash lines in FIG. 2. Thereupon, the urging piece 7b held by a member (not shown) attached to the upper surface cover, the feeding roller back-up roller 8b, the white roller 10 and the discharge back-up roller 11b are moved as indicated by dots-and-dash lines in FIG. 2 and thus, the sheet passing surface is opened to enable the original to be readily removed. The image information read by the original read portion 2, in the case of the copy mode, is transmitted as an image signal to the record portion of the apparatus itself, and in the case of the transmission mode, is transmitted as an image signal to the record portion of another apparatus.

The construction of a sheet feeding portion and a record portion will now be described. The sheet feeding portion 20 and the record portion 21 are provided at the other end side (the right side in FIG. 2) of the original read portion 2 of the apparatus body 1. On the lower side of the apparatus body 1, a cassette 23 containing recording sheets 22 therein is removably held in the apparatus body 1. A cassette cover 24 is formed of a transparent member and therefore, the remaining quantity of the recording sheets 22 can be visually confirmed without the cassette 23 being pulled out of the apparatus body 1.

The sheet feeding portion 20 comprises a separating portion 25 comprised of a pickup roller 25a and a separating piece 25b urged against the pickup roller by a spring (to be described later), a feeding portion 26 comprising a pair of feeding rollers 26a and 26b for feeding the recording sheet 22 separated by the separating portion 25, etc. The record portion 21 comprises an ink jet cartridge 27 as recording means for effecting printing on the recording sheets 22 conveyed from the feeding portion 26, a sheet feeding roller 28 for conveying the recording sheets 22 to a position substantially opposed to the ink jet cartridge 27, a sheet discharging portion 30 comprising a pair of sheet discharging rollers 30a and 30b for discharging the recording sheets after printed from a recording sheet discharge port 29, etc.

The printing operation of the record portion 21 will now be described.

When the original 4 is set on the original guide 5 and a copy starting signal is inputted by an operation switch (not shown) or an image receiving signal is inputted by a telephone circuit or the like, a drive motor (not shown) is driven and the pickup roller 25a is rotated, whereby the recording sheets 22 in the cassette 23 are conveyed to the separating piece 25b and the recording sheets 22 are separated one by one by the separating portion 25 comprised of the pickup roller 25a and the separating piece 25b and are conveyed to the feeding portion 26.

Also, before the recording sheet 22 arrives at the feeding portion 26, another motor (not shown) is driven and the feeding roller 26a, the sheet feeding roller 28 and the sheet discharging roller 30a are rotated to convey the recording sheet 22.

A recording sheet leading end detecting sensor (PE sensor) $S_1$ such as a photosensor or a microswitch is disposed between the feeding roller 26a and the sheet feeding roller 28, and the leading end of the recording sheet 22 is detected by this sensor $S_1$. After the sensor $S_1$ detects the leading end of the recording sheet 22 and the recording sheet 22 is conveyed by a predetermined length, printing is started by the ink jet cartridge 27. When the printing onto the recording sheet 22 is completed, the recording sheet 22 is discharged from the recording sheet discharge port 29 onto the discharge tray 32 by the sheet discharging rollers 30a and 30b. Thereby, the recording of the image information onto one recording sheet 22 is terminated.

A recording cover 31 is designed to be capable of being opened and closed with one end (the right upper portion in FIG. 2) of the apparatus as the center of rotation, as indicated by dots-and-dash line in FIG. 2. Therefore, the ink jet cartridge 27 can be interchanged easily. Also, a sheet discharge sensor $S_2$ for detecting the discharge of the recording sheets 22 is provided near the discharge port.

The operation portion 35 of the facsimile machine will now be described.

The operation portion 35 is for performing the mode switching operation, the copying operation, the transmitting operation, the printer operation, etc. and is provided with keys for these operations. The operation portion 35 is provided on the upper portion of the upper surface cover 1a of the read portion 2. The handset of a telephone set (not shown) for effecting transmission and reception is provided at one end side of the operation portion 35.

Figure 3:
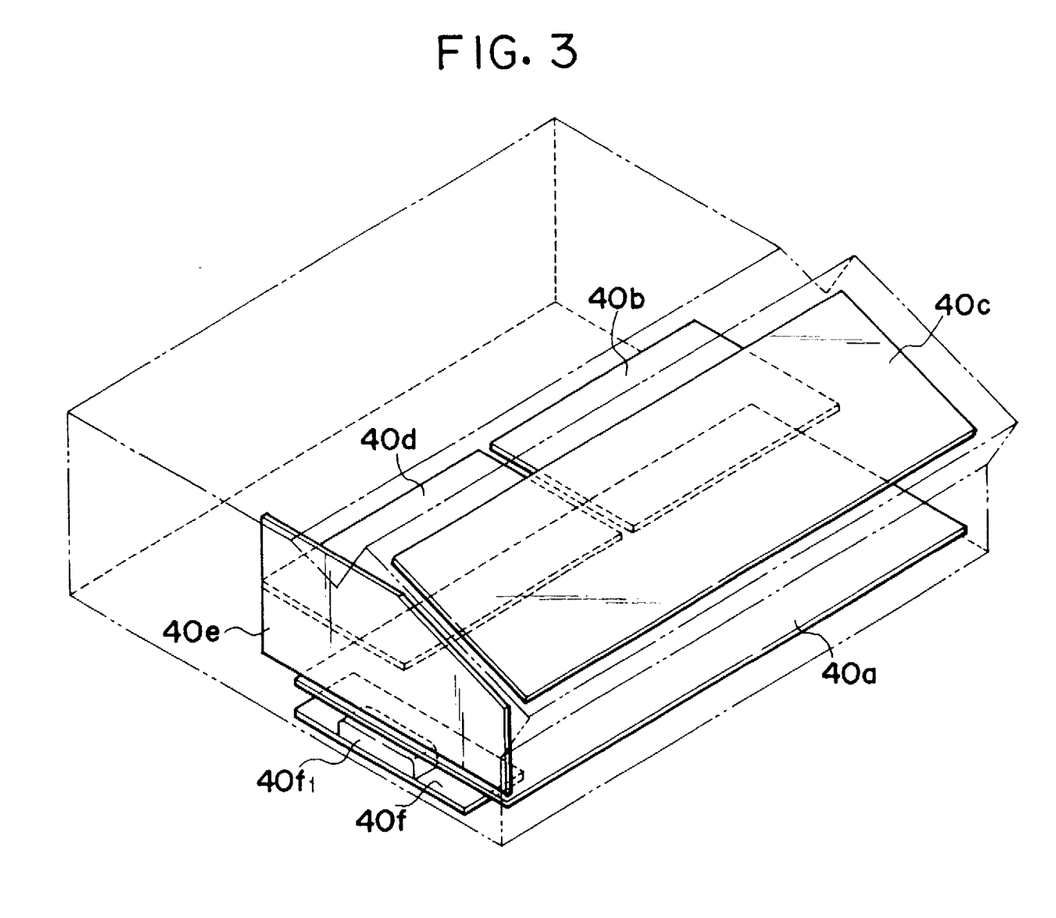
FIG. 3 is a perspective view showing the arranged state of electrical equipment base plates provided in the facsimile machine shown in FIG. 1.

The arrangement of the electrical equipment system will now be described with reference to FIG. 3.

The system base plate 40a of the present apparatus is provided at the bottom of the apparatus, and an electric source unit 40b is provided on the right side of the apparatus. A base plate 40c for controlling the operation portion 35, a relay base plate 40d, a base plate 40e for controlling the telephone set and telephone circuit, and a base plate 40f having a printer interface $40f_1$ placed thereon are provided in the rear of the apparatus.

A control system will now be described with reference to a block diagram shown in FIG. 4.

Figure 4:
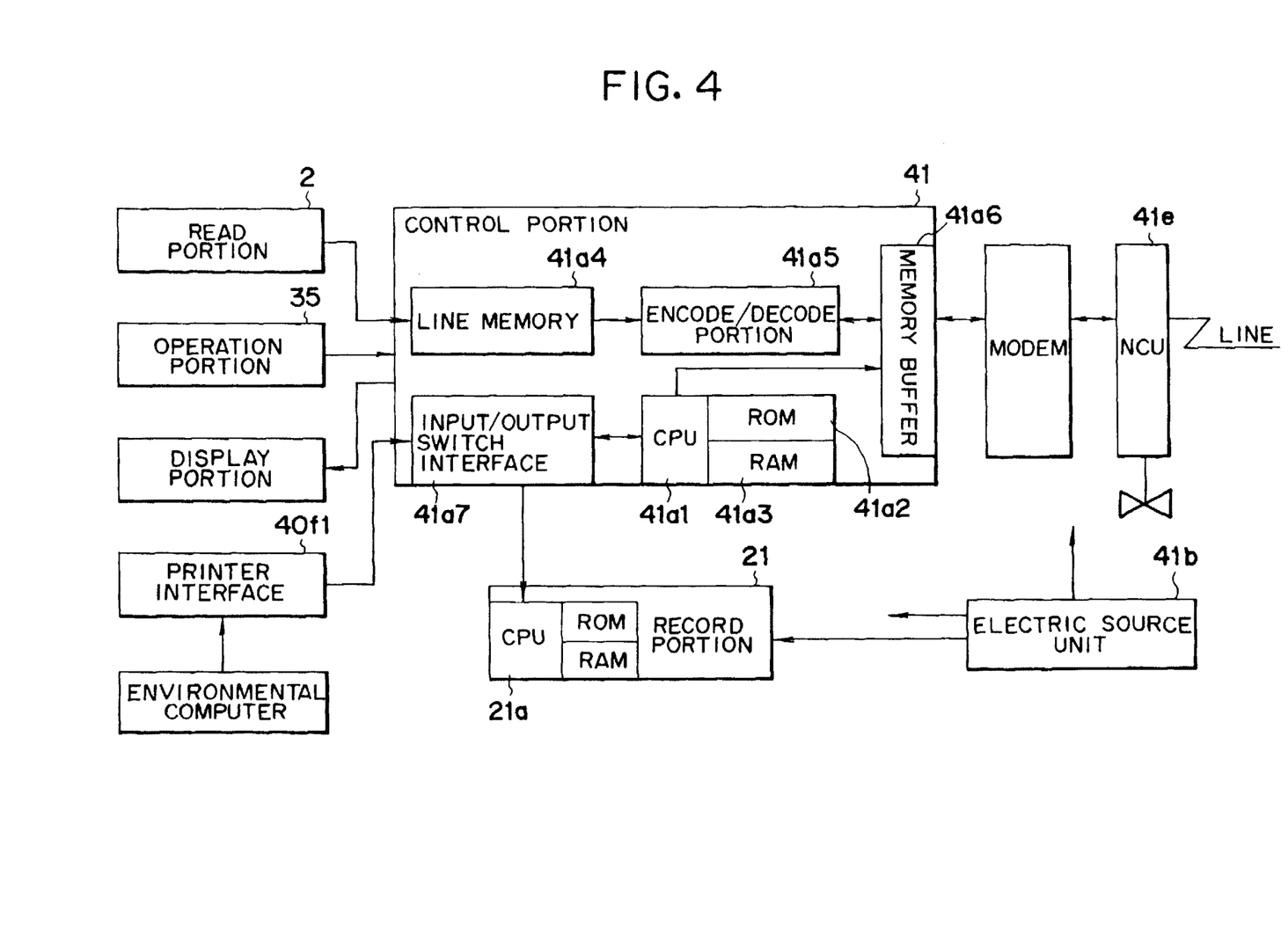
FIG. 4 is a block diagram of the control means of the facsimile machine shown in FIG. 1.

In FIG. 4, the reference numeral 41 designates the control portion of the facsimile machine, and there are disposed an electric source unit 41b for supplying electric power to the entire apparatus, a modem base plate unit, an NCU base plate unit 41e for connecting the telephone set, a display portion for displaying substances inputted from the operation portion 35, a printer interface $40f_1$ for obtaining the data from an environmental computer, etc.

The control portion 41 has a CPU $41a_1$ for effecting the control of the entire apparatus, an ROM $41a_2$ storing various programs and various data therein, an RAM $41a_3$ used as the work area of the CPU $41a_1$ and effecting the temporary preservation of various data including the number of records, an input/output switch interface $41a_7$ for effecting the switching of the facsimile and the printer, etc.

The reference character $41a_4$ denotes a line memory storing therein the image of each line of image data. In the case of the transmission or copying of the original, image data for one line from the original read portion 2 are stored in the line memory $41a_4$, and in the case of the reception of image data, data for decoded one line are stored in the line memory $41a_4$. The image data stored in the line memory $41a_4$ pass through the CPU $41a_1$, and with a record system control code added thereto, are outputted from the input/output switch interface $41a_7$ to the CPU 21a of the record system 21, and the CPU 21a decodes the record system control code, whereby image recording is effected. The reference character $41a_5$ designates an encode/decode portion for encoding transmitted image information by MH encoding or the like and decoding the received encoded image data to convert such data into image data. The reference character $41a_6$ denotes a buffer memory for storing the transmitted and received encoded image data therein.

The control of the printing function will now be described.

The data from the environmental computer and the record system control code from the printer interface $41f_1$ are first introduced into the present apparatus. They are then outputted from the input/output switch interface $41a_7$ to the CPU 21a of the record system 21, and the CPU 21a decodes the record system control code, whereby print recording is effected. The CPU $41a_1$ of the control portion 41 is designed so as not to effect the control of print recording at this time. By doing so, the switching of the facsimile and the printer is simplified.

The construction of the sheet feeding portion 20 will now be described in detail with reference to FIG. 2 and FIGS. 5, 6, 7A and 7B.

The cassette 23 is provided with a cassette container 23a, an intermediate plate 23b disposed in the cassette container 23a, a coil spring 23c for biasing the intermediate plate 23b toward the pickup roller 25a side, and the aforementioned cassette cover 24. The recording sheets 22 supported on the intermediate plate 23b are urged against the pickup roller 25a with predetermined pressure by the biasing force of the coil spring 23c.

The pickup roller 25a is a roller formed of a material of high coefficient of friction such as silicone rubber, and is rotated in the direction of arrow in FIG. 2 to thereby feed out the recording sheets 22 supported on the intermediate plate 23b in the cassette 23. The pickup roller 25a is mounted on a drive shaft through a one-way clutch 25c (shown in FIG. 6), and can be rotated in the direction of arrow in FIG. 2 in an almost no load state.

Figure 6:
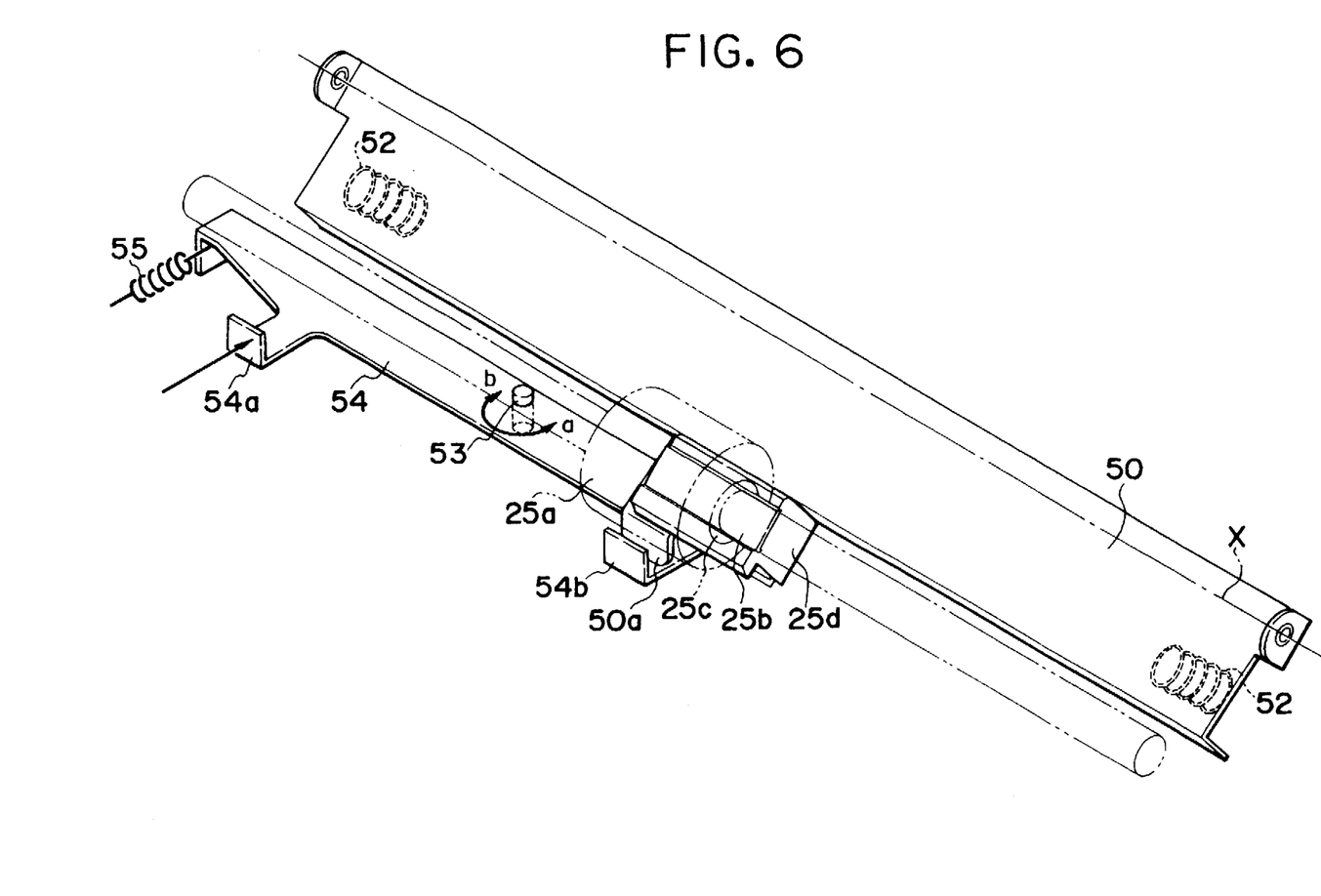
FIG. 6 is a perspective view showing the construction of a separating portion provided in the facsimile machine shown in FIG. 1.
Figure 7A:
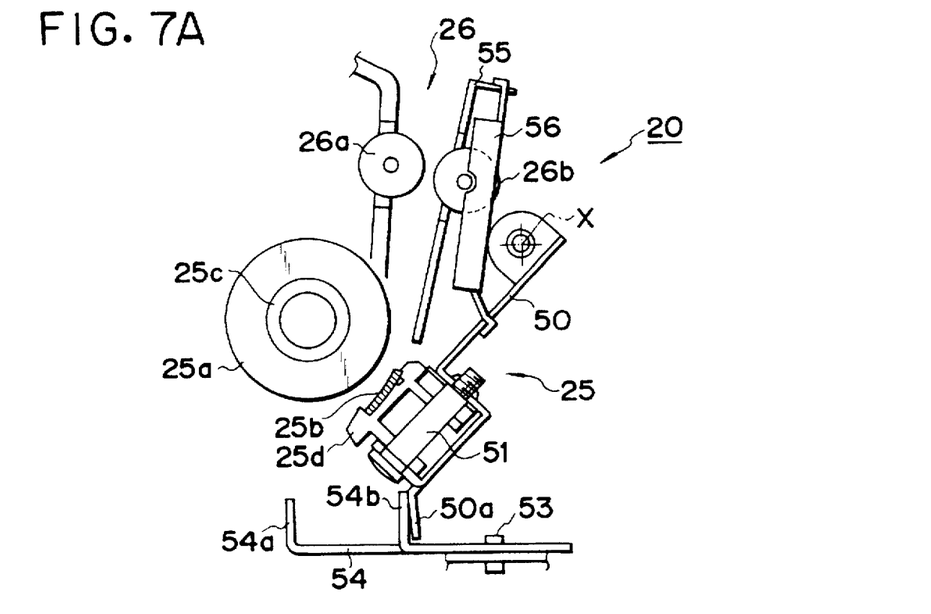
FIGS. 7A and 7B show the separating portions provided in the facsimile machine shown in FIG. 1 and a pressure releasing mechanism in a feeding portion.
Figure 7B:
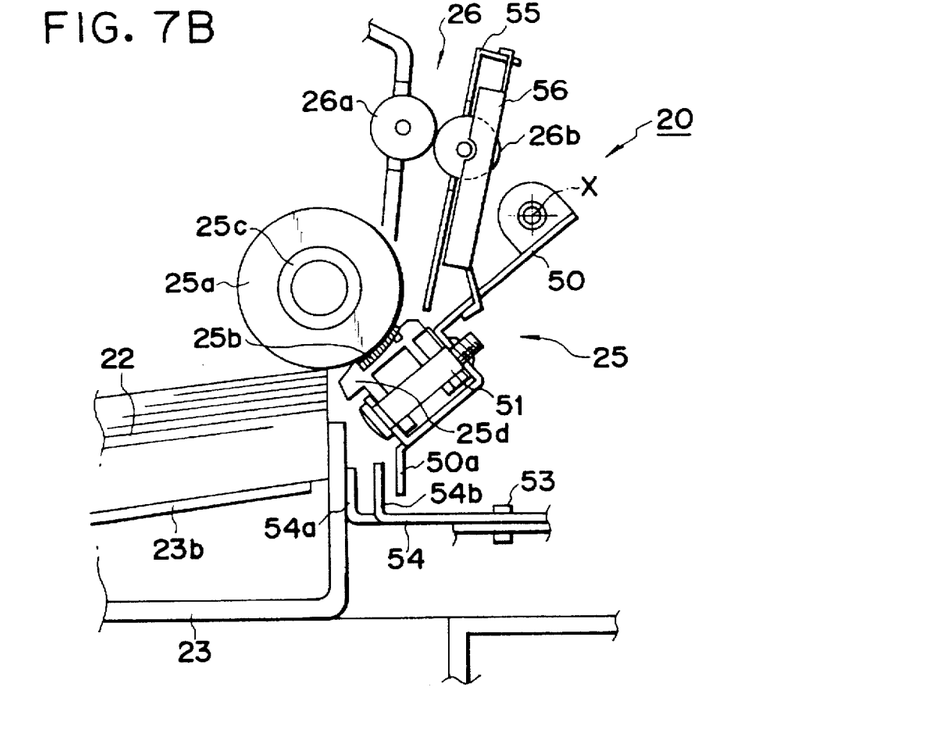

The separating piece 25b is formed of a material of high friction such as urethane rubber containing cork, and is adhesively or otherwise fixed to a holder member 25d shown in FIGS. 6, 7A and 7B. The holder member 25d is supported for rightward and leftward pivotal movement on an arm member 50 by a pin 51, the arm member 50 being pivotably provided in the apparatus body 1. The arm member 50 is pivotably movable about an axis X and is biased by right and left coil springs. 52 in a direction to urge the separating piece 25b against the pickup roller 25a.

When by such construction, the pickup roller 25a is rotated in the direction of arrow in FIG. 2 with a drive force transmitted from a drive source, not shown, the recording sheets 22 contained in the cassette 23 are fed out, and are separated one by one between the pickup roller 25a and the separating piece 25b. That is, when a plurality of recording sheets 22 have been fed out by the pickup roller 25a, the other recording sheets than the uppermost recording sheet are prevented from being fed by the separating piece 25b and only the uppermost recording sheet is fed out toward the feeding portion 26.

In the sheet feeding portion 20, the recording sheets 22 in the horizontally placed cassette 23 are separated one by one by the pickup roller 25a and the separating piece 25b and are fed out with the direction of the upwardly conveyed recording sheets changed. The recording sheets 22 are then fed one by one to the record portion 21 disposed above the sheet feeding portion 20.

Here, the construction for facilitating jam treatment which is an essential portion of the present invention will be described in detail.

A releasing member 54 pivotally movable in a horizontal plane about a pin 53 is disposed under the arm member 50, and is rotatively biased in the direction of arrow a in FIG. 6 by a spring 55. The releasing member 54 is formed with a bearing piece 54a against which the cassette 23 inserted into the apparatus body 1 can bear. When the cassette 23 bears against the bearing piece 54a and the cassette 23 is further pushed in, the releasing member 54 rotates in the opposite direction (the direction of arrow b) against the biasing force of the spring 55.

The releasing member 54 is also formed with an engagement piece 54b engageable with a tongue piece 50a formed on the arm member 50, and the engagement piece 54b is adapted to be engaged with the tongue piece 50a when the cassette 23 is not mounted and the arm member 50 is rotatively biased in the direction of arrow a. Since the resilient force of the spring 55 biasing the releasing member 54 in the direction of arrow a is greater than the resilient force of the coil spring 52 biasing the arm member 50, the engagement piece 54b of the releasing member 54 pushes the tongue piece 50a by the resilient force of the spring 55, as shown in FIG. 7A, to thereby rotate the arm member 50 downwardly and space the separating piece 25b apart from the pickup roller 25a.

When the cassette 23 is mounted, the bearing piece 54a is pushed in by the cassette 23 and the releasing member 54 is rotated in the direction of arrow b and thus, the engagement piece 54b becomes disengaged from the tongue piece 50a. Thereby, as shown in FIG. 7B, the arm member 50 is rotated upwardly by the biasing force of the coil spring 52 and the separating piece 25b is urged against the pickup roller 25a.

Thus, when the cassette 23 is not mounted in the apparatus body 1, the separating piece 25b is spaced apart from the pickup roller 25a and the separating pressure thereof is released, and when the cassette 23 is mounted in the apparatus body 1, the separating piece 25b is urged against the pickup roller 25a with predetermined separating pressure and becomes capable of separating the recording sheets 22.

This construction for releasing the separating pressure is also effective when recording sheets 22 are additionally loaded into the cassette 23. When the cassette 23 is to be pulled out of the apparatus body 1 and recording sheets 22 are to be additionally loaded into the cassette, a recording sheet may be left held between the pickup roller 25a and the separating piece 25b when the cassette 23 is pulled out, but according to the above-described construction, the separating piece 25b becomes spaced apart from the pickup roller 25a and therefore, the recording sheets are pulled out as the cassette 23 is pulled out. This eliminates such an accident that the cassette 23 is mounted again with recording sheets left therein and the left recording sheets are damaged.

A pressure releasing mechanism in the feeding portion 26 will now be described.

As shown in FIGS. 7A and 7B, the feeding portion 26 comprising the feeding roller 26a and the feeding back-up roller 26b as described above is provided downstream of the pickup roller 25a, and the feeding roller 26a is rotated with a drive force transmitted thereto from a drive source, not shown, and the feeding back-up roller 26b is urged against the feeding roller 26a with predetermined feeding pressure.

The feeding back-up roller 26b comprises a roller portion and a shaft portion, and the roller portion protrudes toward the feeding roller 26a side through an opening formed in a guide plate 55 for guiding the recording sheets 22, and the shaft portion is held by a holding member 56 having one end thereof pivotably mounted on the guide plate 55. The other end of the holding member 56 is engaged with the arm member 50. The holding member 56 is pivotally moved in operation association with the pivotal movement of the arm member 50. The holding member 56 is biased by a spring, not shown, so that the feeding back-up roller 26b may be urged against the feeding roller 26a.

When as shown in FIG. 7A, the cassette 23 is not mounted in the apparatus body 1, the arm member 50 is rotated downwardly as described above and therewith, the holding member 56 is also pivotally moved to thereby space the feeding back-up roller 26b apart from the feeding roller 26a. When the cassette 23 is mounted, the arm member 50 is rotated upwardly as shown in FIG. 7B and therewith, the holding member 56 is also pivotally moved to thereby urge the feeding back-up roller 26b against the feeding roller 26a. Thus, when the cassette 23 is not mounted in the apparatus body 1, the separating pressure between the pickup roller 25a and the separating piece 25b is being released and further, the feeding pressure between the feeding back-up roller 26b and feeding roller 26a of the feeding portion is being released, and when the cassette 23 is mounted, the pickup roller and the feeding back-up roller are urged against the separating piece and the feeding roller, respectively, with predetermined pressure.

Figure 5:
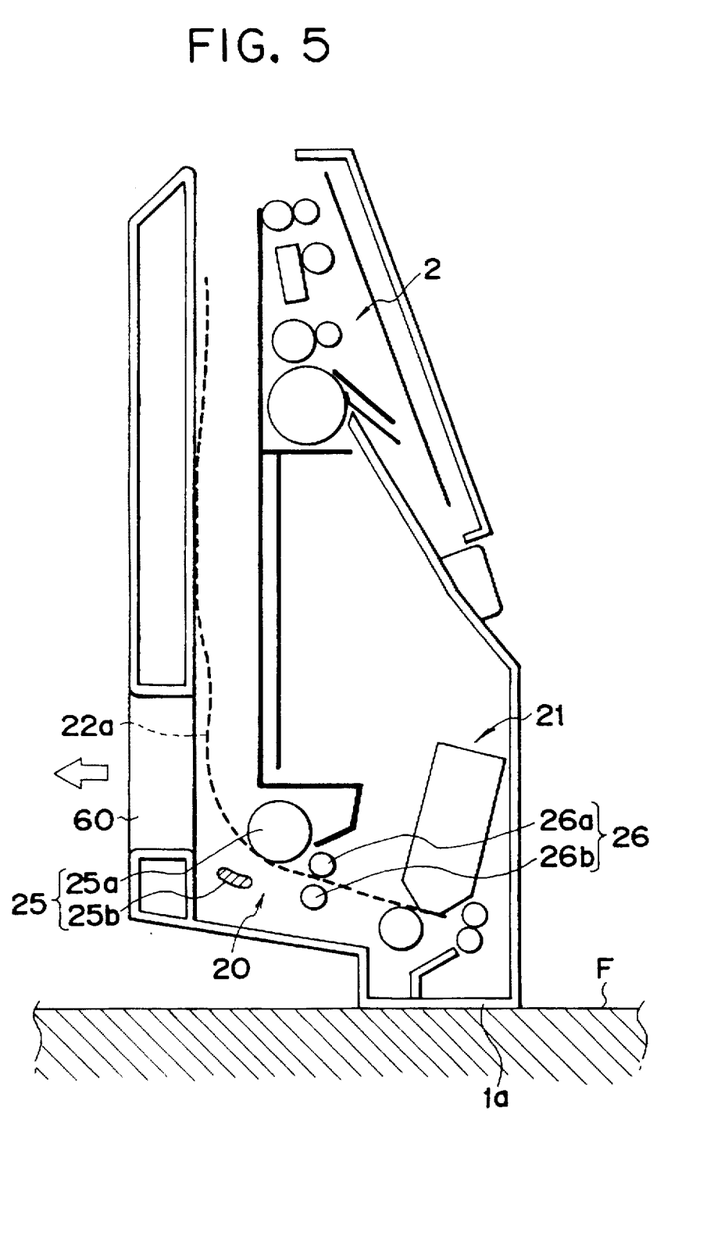
FIG. 5 is a cross-sectional view showing the jam treating state in the facsimile machine shown in FIG. 1.

On the other hand, an opening 60 for jam treatment is formed in the bottom surface which is the outer surface of the apparatus body 1 so that a recording sheet 22a jammed before it arrives the sheet discharging portion 30 can be pulled out. This opening 60 is disposed on the extension Y of the conveyance path of the record portion from the feeding portion 26 and on the side opposite to the sheet discharging portion 30.

Description will now be made of the manner of treating the jam of the recording sheet 22 fed out from the cassette 23. The recording sheet leading end detecting sensor $S_1$ and sheet discharge sensor $S_2$ provided in the conveyance path have the function of detecting the jam of the recording sheet 22, and when the sensors $S_1$ and $S_2$ continue to detect the recording sheet 22 for a predetermined time, the control portion 41 judges it as jam and stops the sheet feeding operation and the recording operation.

When the recording sheet 22 passes through the sheet discharging portion 30 and is jammed with its leading end protruded outwardly, the operator can pull out the recording sheet 22 by holding the leading end thereof. If at this time, the cassette 23 is pulled a little out of the apparatus body 1, the separating pressure of the pickup roller 25a and separating piece 25b and the feeding pressure of the feeding back-up roller 26b and feeding roller 26a will be released and therefore, the jammed recording sheet 22 can be pulled out easily.

Also, a recording sheet 22 jammed without its leading end reaching the sheet discharging portion 30 as indicated by broken line in FIG. 5 is treated in the following manner. In such case, the opening 60 formed in the bottom surface is closed by the cassette 23 and therefore, the cassette 23 is first pulled out of the apparatus body 1. Thereby, the separating pressure of the pickup roller 25a and separating piece 25b and the feeding pressure of the feeding back-up roller 26b and feeding roller 26a of the feeding portion 26 are released and the opening 60 is opened.

A planar portion 1a which is supporting means is formed on the rear surface of the apparatus body 1 so that the facsimile apparatus can be maintained in its upright state. As this supporting means, instead of a planar portion 1a, any construction which can support the facsimile apparatus in its upright state, such as a construction provided with a plurality of supporting legs or a construction provided with a plurality of planar portions may be adopted.

Then, as shown in FIG. 5, the facsimile machine is stood up on the upper surface F of a desk with the planar portion 1a of its rear surface down, and in this stood up state, the jammed recording sheet 22a is pulled out through the opening 60 in the bottom surface of the apparatus body 1. Since at this time, the separating pressure and the feeding pressure are released, the jammed recording sheet 22a can be pulled out easily. Further, the opening 60 is disposed on the extension of the conveyance path and therefore, the jammed recording sheet 22a can be linearly pulled out and thus, no damage will be imparted to the recording sheet 22a when it is pulled out, and the recording sheet thus pulled out can be reused.

Also, in this facsimile machine, the relatively weightly record portion 21 is disposed on the rear side and therefore, when the machine is stood on end as shown in FIG. 5, the center of gravity thereof becomes lower to make it difficult for the machine to fall down, and jam treatment can be done with the machine supported easily.

Description will now be made of another embodiment of the mechanism for releasing the separating pressure of the separating piece 25b and pickup roller 25a.

Figure 8A:
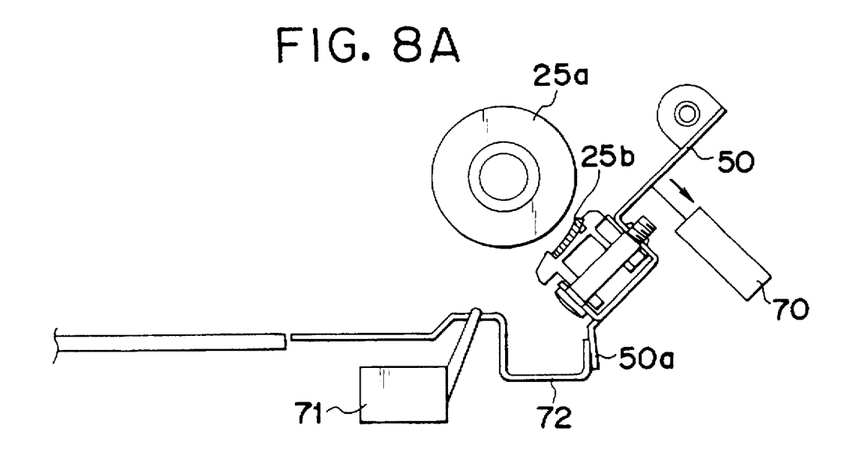
FIGS. 8A and 8B show other embodiments of the pressure releasing mechanism.
Figure 8B:
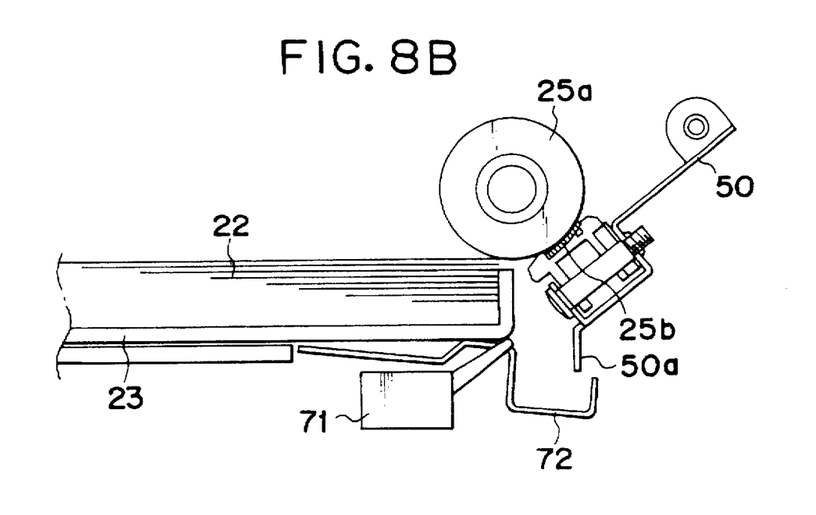

As shown in FIGS. 8A and 8B, a solenoid 70 is connected to the arm member 50 supporting the separating piece 25b, and design is made such that the arm member 50 is pulled down by the solenoid 70 and the pressure of the separating piece 25b and the pickup roller 25a is released. The operation of the solenoid 70 is controlled by the ON-OFF of a detecting switch 71 for detecting the mounting of the cassette 23 onto a predetermined location in the apparatus body 1.

With the arm member 50 pulled down, the tongue piece 50a of the arm member 50 is regulated by a leaf spring 72 provided under the arm member, as shown in FIG. 8A, and the separating piece 25b is maintained spaced apart from the pickup roller 25a. Accordingly, when the cassette 23 is pulled out of the apparatus body 1, the arm member 50 is pulled down by the solenoid 70 and the separating pressure is released, and the separated state is maintained by the leaf spring 72.

Also, when the cassette 23 is mounted, the leaf spring 72 is forced down by the cassette 23 and becomes disengaged from the tongue piece 50a of the arm member 50. Thereby, the arm member 50 is forced up by the coil spring 52 and the separating piece 25b is urged against the pickup roller 25a. This brings about a state in which the recording sheets 22 can be separated and fed out.

An embodiment in which the opening for jam treatment is provided in other portion will now be described with reference to FIG. 9.

An opening 60a is formed in the rear surface which is the outer surface of the apparatus body, and a jammed recording sheet 22 is treated by being pulled out through this opening 60a. The feeding back-up roller 26b of the feeding portion 26 is mounted on a guide member 61 which is supported on the apparatus body 1 for pivotal movement about a fulcrum 62. The separating piece 25b is also engaged with the guide member 61 and moves in operative association with the pivotal movement of the guide member 61. Accordingly, when a recording sheet is jammed, the guide member 61 is pivotally moved to a position indicated by broken line in FIG. 9, whereby the feeding pressure and the separating pressure are released and the jammed recording sheet 22a can be pulled out through the opening 60a. In this case, the facsimile apparatus need not be stood up and jam treatment can be done with the cassette 23 mounted in the apparatus body 1, and this means a good working property.

Figure 9:
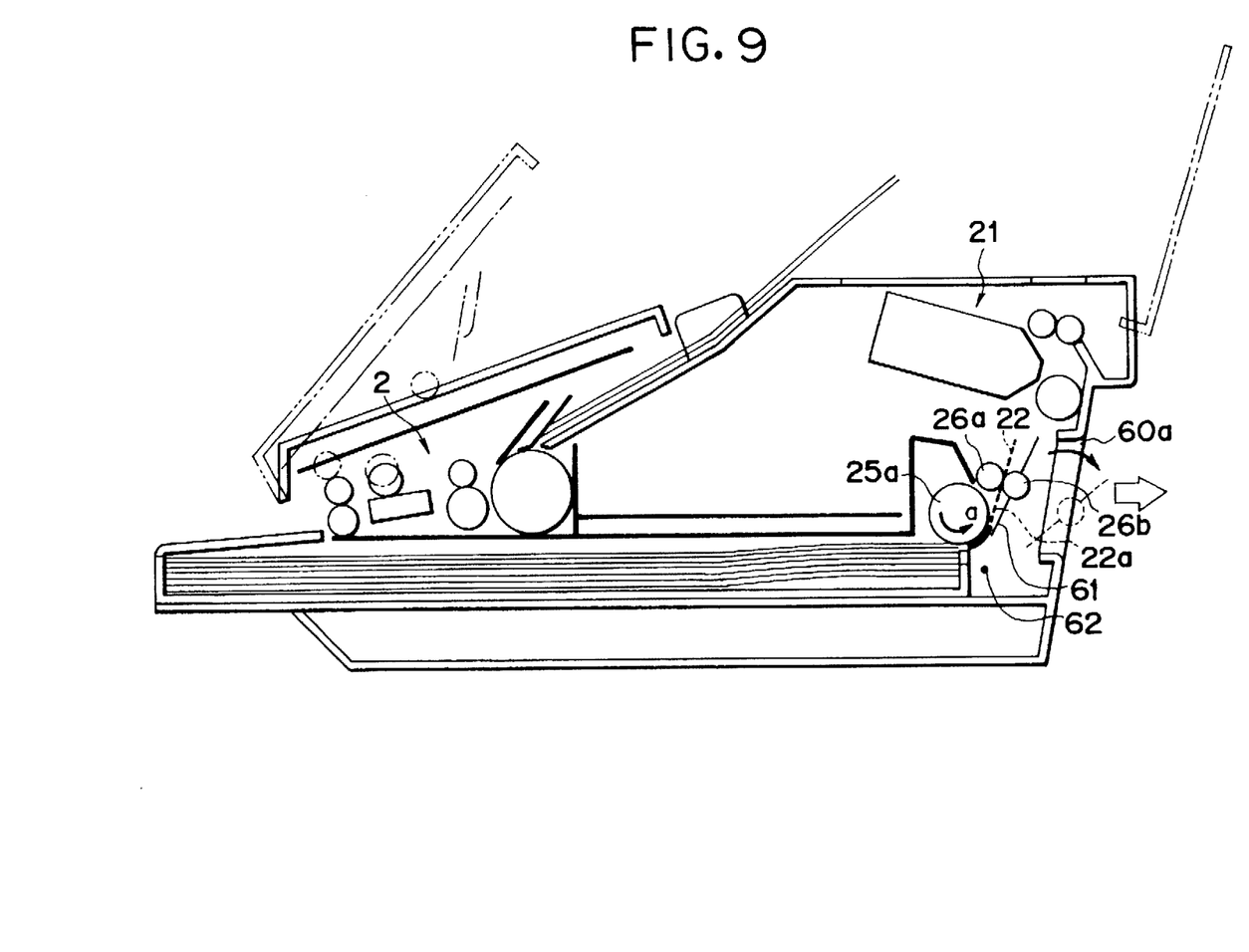
FIG. 9 is a cross-sectional view showing another embodiment of the opening for jam treatment.

The pickup roller 25a can be rotated in the direction of arrow in FIG. 9 with almost no load by the one-way clutch 25c and therefore, even if the separating piece 25b is urged against the pickup roller 25a when the recording sheet 22a is pulled out through the opening 60a, it will not provide a great resistance and thus, provision need not be made of a mechanism for spacing the separating piece 25b apart from the pickup roller 25a in operative association with the pivotal movement of the guide member 61.

The present invention is not restricted to the above-described embodiments, and for example, jam treatment is done with the facsimile machine stood up with its rear surface down, but alternatively jam treatment may be done with the machine stood up with its side down. Also, design is made such that the release of the separating pressure and the release of the feeding pressure are effected in operative association with the mounting and dismounting of the cassette, but alternatively, design may be made such that the operator manually spaces the separating piece apart from the pickup roller and pulls out the jammed recording sheet. Again in this case, provision may be made of such an operatively associated mechanism that the feeding back-up roller is spaced apart from the feeding roller by the movement of the separating piece. Further, in the above-described embodiments, a facsimile machine has been taken up as an example of the recording apparatus to which the present invention is applied, but the present invention may also be applied to other recording apparatuses such as a copying apparatus and a printer.

According to the present invention, an opening for communicating the conveyance path with the outside is formed in the outer surface of the apparatus body so that any jammed sheet can be pulled out easily without the operation of opening the conveyance path and therefore, the costs of the apparatus can be reduced. Also, since jam treatment is not effected by opening and closing as in the prior-art mechanism, there will not arise a problem that recording accuracy is reduced.

In the apparatus wherein the opening is formed in the bottom surface, jam treatment is done by pulling a jammed sheet out of the opening with the apparatus body in its upright state, but since the opening is in the bottom surface, usually any foreign substance is prevented from entering the conveyance path and adversely affecting the interior of the apparatus. Further, the external appearance of the apparatus becomes bad and the commercial value thereof is not reduced. Furthermore, if the opening formed in the bottom surface is disposed on the extension of the conveyance path, any jammed sheet could be pulled out straight through the opening and thus, no damage will be imparted to the sheet and the jammed sheet could be reused.

If the opening is formed in the side of the apparatus body, any jammed sheet could be pulled easily out of the conveyance path without the apparatus body being stood up and therefore, the operability of the apparatus could be more improved.

In an apparatus wherein the separating portion for separating and feeding sheets is constructed of a rotatable feeding member and a separating member and provision is made of a pressure releasing mechanism for releasing the pressure contact force between the rotatable feeding member and the separating member, the pressure contact force is released by the pressure releasing mechanism and then any jammed sheet is pulled out, whereby the operation can be performed easily and no damage is imparted to the sheet. Also, in an apparatus wherein pressure release is effected in response to the separation of the cassette from the apparatus body, the pressure contact force is automatically released simply by pulling out the cassette and therefore, any jammed sheet can be pulled out very easily and the operability of the apparatus is further improved.

By the relatively weightly record portion being disposed in the rear of the apparatus body, the center of gravity comes to be positioned at the down side when the apparatus body is stood up, and the apparatus body can be stably maintained in its upright state. Thus, any fore for supporting the apparatus body is not necessary, and simply by the operation of standing up the apparatus body, any jammed sheet can be pulled out easily.

What is claimed is:

1. A recording apparatus having a main body with a bottom surface, comprising:
   sheet supporting means for supporting sheets in a horizontal state;
   sheet feeding means for feeding out the sheet supported on said sheet supporting means from a front end thereof in an inserting direction of said sheet supporting means into the main body;
   a conveyance path for guiding the sheet fed out by said sheet feeding means obliquely in an upward direction in a linear state to above the main body;
   recording means for recording information on the sheet being guided by said conveyance path linearly; and
   an opening formed on the bottom surface of the main body and located on an extension line of said conveyance path extending downwardly in a direction opposite to a sheet convey direction for allowing a pullout of the sheet jammed in said conveyance path downwardly.

2. A recording apparatus according to of claim 1, further comprising a cassette provided on an upstream side of said conveyance path and containing therein the sheet to be supplied to said recording means, and sheet feeding means for feeding the sheet out of said cassette, said cassette being provided removably in a horizontal direction relative to the apparatus body, the downstream side of said conveyance path upwardly guiding the sheet fed out of said cassette.

3. A recording apparatus according to claim 1, wherein said recording means is of an ink jet type which discharges ink from a discharge opening to thereby record an image on the sheet.

4. A facsimile machine having a main body with a bottom surface comprising:
   sheet supporting means for supporting sheets in a horizontal state;
   sheet feeding means for feeding out the sheet supported on said sheet supporting means from a front end thereon in an inserting direction of said sheet supporting means into the main body;
   a conveyance path for guiding the sheet fed out by said sheet feeding means obliquely in an upward direction in a linear state to above the main body;
   recording means for recording information on the sheet being guided by said conveyance path linearly; and
   an opening formed on the bottom surface of the main body and located on an extension line of said conveyance path extending downwardly in a direction opposite to a sheet convey direction for allowing a pullout of the sheet jammed in said conveyance path downwardly; and
   image reading means for conveying an original from an upper surface of said machine body toward a front surface thereof, and for reading an image described on the original in the course of conveyance thereof.

5. A recording apparatus having a main body with a bottom surface comprising:
   sheet supporting means for supporting sheets in a horizontal state;
   sheet feeding means for feeding out the sheet supported on said sheet supporting means from a front end thereof in an inserting direction of said sheet supporting means into the main body;
   a conveyance path for guiding the sheet fed out by said sheet feeding means obliquely in an upward direction in a linear state to above the main body;
   recording means for recording information on the sheet being guided by said conveyance path linearly;
   an opening formed on the bottom surface of the main body and located on an extension line of said conveyance path extending downwardly in a direction opposite to a sheet convey direction; and
   supporting means for supporting the main body of said recording apparatus in an upright state allowing a pullout of the sheet jammed in said conveyance path downwardly.

6. A recording apparatus according to claim 5, further comprising a cassette provided on an upstream side of said conveyance path and containing therein the sheet to be supplied to said recording means, and sheet feeding means for feeding the sheet out of said cassette, said opening being closed by said cassette mounted in said apparatus body.

7. A recording apparatus according to claims 5 or 6, wherein a center of gravity of the apparatus body is positioned at the down side with the apparatus body being in its upright state by disposing said recording means in a rear portion of said apparatus body.

8. A recording apparatus according to claim 5 or 7, wherein said recording means is an ink jet type recording means is an ink jet type which discharges ink from a discharge opening to thereby record an image on the sheet.

9. A facsimile machine having a main body with a bottom surface comprising:
   sheet supporting means for supporting sheets in a horizontal state;
   sheet feeding means for feeding out the sheet supported on said sheet supporting means from a front end thereof in an inserting direction of said sheet supporting means into the main body;
   a conveyance path for guiding the sheet fed out by said sheet feeding means obliquely in an upward direction in a linear state to above the main body;
   recording means for recording information on the sheet being guided by said conveyance path linearly;
   an opening formed on the bottom surface of the main body and located on an extension line of said conveyance path extending downwardly in a direction opposite to a sheet convey direction;

supporting means for supporting said main body of said machine in an upright state allowing a pullout of the sheet jammed in said conveyance path downwardly; and image reading means for conveying an original from an upper surface of said machine main body toward a front surface thereof, and for reading an image described on said original in the course of the conveyance thereof.

10. A recording apparatus having a main body with a bottom surface comprising:

sheet supporting means removably provided in the main body for supporting recording sheets in a horizontal state;

separating means disposed at a side of said apparatus opposite to a mount portion of said sheet supporting means for separating the sheets fed out from said sheet supporting means one by one, said separating means including a rotatable feeding member disposed on the main body of said recording apparatus and a friction member disposed on the main body of said recording apparatus to be urged against said rotatable feeding member by a separating pressure;

separating pressure releasing means for releasing the separating pressure of said separating means;

a conveyance path for guiding the sheet fed out by said sheet feeding means obliquely in an upward direction in a linear state to above the main body;

recording means for recording information on the sheet being guided by said conveyance path linearly; and an opening formed in the bottom surface of the main body and located at a position corresponding to said separating means for allowing a pull out of the sheet jammed in said conveyance path downwardly to outside of said recording apparatus, wherein said separating pressure releasing means releases the separating pressure to enable the stopped sheet to be pulled out through the opening.

11. A recording apparatus according to claim 10, wherein said sheet supporting means is a cassette containing the recording sheets therein and removably provided in the body of said apparatus, and said separating pressure releasing means releases the separating pressure of said separating means in response to the removal of said cassette from the body of said apparatus.

12. A recording apparatus according to claim 11, wherein said separating pressure releasing means is provided with a first resilient member for biasing said friction member toward said rotatable feeding member, and a second resilient member provided for biasing said friction member away from said rotatable feeding member and having a resilient force greater than that of said first resilient member, and with said cassette being not mounted in said apparatus body, said second resilient member acts to space said friction member apart from said rotatable feeding member, while with said cassette being mounted in said apparatus body, said second resilient member becomes inactive and said friction member is urged against said rotatable feeding member by said first resilient member.

13. A recording apparatus according to claim 10, 11, or 12, further comprising a pair of rotatable conveying members for conveying the sheet to said conveyance path wile nipping the sheet therebetween with predetermined conveying pressure, and an associated mechanism operatively associated with the release of the separating pressure of said separating means by said separating pressure releasing means for releasing said conveying pressure.

14. A recording apparatus according to claim 11, wherein said cassette is mounted substantially horizontally in said apparatus body, said conveyance path is disposed substantially vertically, and said opening is disposed on an extension line of said conveyance path.

15. A recording apparatus according to claim 10, 11, 12, or 14, wherein said recording means is an ink jet type which discharges ink from a discharge opening to thereby record an image on the sheet.

16. A facsimile machine having a main body with a bottom surface comprising:

sheet supporting means removably provided in the body for supporting recording sheets in a horizontal state;

separating means disposed at a side of said apparatus opposite to a mount portion of said sheet supporting means for separating the sheets fed out from said sheet supporting means one by one, said separating means including a rotatable member disposed on the main, body of said recording apparatus and a friction member disposed on the main body of said recording apparatus to be urged against said rotatable feeding member by a separating pressure;

separating pressure releasing means for releasing the separating pressure of said separating means;

a conveyance path for guiding the sheet into said machine obliquely in an upward direction in a linear state to above the main body;

recording means for recording information on the sheet being guided by said conveyance path linearly; and an opening formed in the bottom surface of the main body and located at a position corresponding to said separating means for allowing a pull out of the sheet jammed in said conveyance path downwardly to outside of said recording apparatus, wherein said separating pressure releasing means releases the separating pressure to enable the stopped sheet to be pulled out through the opening; and image reading means for conveying an original from an upper surface of said machine body toward the front surface thereof, and reading an image described on said original in the course of the conveyance thereof.

17. A recording apparatus having a main body with a bottom surface comprising:

sheet supporting means for supporting sheets in a horizontal state;

separating means for separating the sheets fed out from said sheet supporting means one by one, said separating means including a rotatable feeding member and a friction member urged against said rotatable feeding member by a separating pressure;

separating pressure release means for releasing the separating pressure of said separating means;

a conveyance path for guiding the sheet fed out by said sheet feeding means obliquely in an upward direction in a linear state to above the main body;

conveying means disposed in said conveyance path for conveying the sheet, said conveying means including a pair of convey rollers urged against each other with a conveying pressure;

conveying pressure release means for releasing the conveying pressure of said convey means;

recording means for recording an information on the sheet being guided by said conveyance path linearly; and an opening, formed on the bottom surface of the main body for allowing a pull out of a sheet jammed in said conveyance path there through to an outside of said recording apparatus, wherein said conveyance pressure release means and said separation pressure releasing means are so connected with each other that the separating pressure is released by said separation pressure releasing means and then the conveying pressure is released by said conveying pressure release means to thereby enable the jammed sheet to be pulled out downwardly through the opening.

18. A recording apparatus according to claim 17, further comprising an opening formed on a bottom surface of a body of said recording apparatus to enable the sheet stopped at said conveying means to be pulled out through said opening from outside of said recording apparatus in its upright state.

* * * * *

UNITED STATES PATENT AND TRADEMARK OFFICE
CERTIFICATE OF CORRECTION

PATENT NO. : 5,731,885
DATED : March 24, 1998
INVENTOR(S) : Hideaki NAGAHARA

It is certified that error appears in the above-identified patent and that said Letters Patent is hereby corrected as shown below:

Column 1, line 42, delete "Rust" and insert therefor --must--.

Column 9, line 27, delete "weightly" and insert therefor --weighty--.

Column 11, line 19, delete "weightly" and insert therefor --weighty--;
    Line 47, delete "of".

Column 12, line 49, delete "claim" and insert therefor --claims--, and
        after "5", insert --, 6--;
    Line 51, delete "is an ink jet type".

Column 13, line 64, delete "wile" and insert therefor --while--.

Column 14, line 8, delete "claim" and insert therefor --claims--.

Column 15, line 3, delete "there through" and insert therefor
        --therethrough--.

Signed and Sealed this

Seventeenth Day of November, 1998

Attest:

BRUCE LEHMAN

*Attesting Officer*    *Commissioner of Patents and Trademarks*